UNITED STATES PATENT OFFICE.

HARTWICH VON UNWERTH, OF NEW YORK, N. Y.

IMPROVEMENT IN THE MANUFACTURE OF ARTIFICIAL STONES FOR GRINDING AND POLISHING METALS.

Specification forming part of Letters Patent No. 54,628, dated May 8, 1866.

*To all whom it may concern:*

Be it known that I, HARTWICH VON UN-WERTH, of the city, county, and State of New York, have invented or discovered a new and useful Improvement in the Manufacture of Artificial Stones for Grinding, Polishing, Burnishing, or Abrading Metals, Stones, or other Articles in the manufacture of cutlery, jewelry, and other mechanical arts or appliances; and I do hereby declare that the following is a full, clear, and exact description of the same.

To enable others skilled in the art to make and use these artificial stones, I will proceed to describe the ingredients and their proportions, as well as the manner of compounding and manufacturing the same to render them fit for the several uses to which they may be applied.

Of the following ingredients I take about as follows: first, one part of litharge (*plumbum oxydatum flavum;*) second, one part of red lead (*plumbum super oxydatum rubrum;*) third, three-fourths of one part of oxide of iron; fourth, one and a half part of crystallized silicate, (quartz melted with alkalies poured into cold water, dried, and finely pulverized;) fifth, one-fifth of one part of calcined lamp-black; sixth, five parts of emery, varying in grain according to the quality or induration of the stone to be produced. These ingredients are well mixed in a china or other vessel, under a temperature of from 60° to 70° Fahrenheit's scale, until all moisture is evaporated. After this admixture is well dried I add, seventh, from four to five parts of liquid Fuchs' bisilicate (composed of about seventy to eighty parts of quartz, twelve to fifteen parts of potassium, and twelve to fifteen parts of soda) of the consistency of jelly, heated until near the boiling-point, and at once well mixed with the above composition and stirred with a pestle until well bound.

The mass thus prepared may be poured into a mold of any given form—thin, thick, flat, round, half-round, or any other required form or shape desired. While the mass or composition is in the mold a pressure of from six hundred to eight hundred pounds should be applied to give it a compact form. After a few minutes' pressure—say fifteen—one of the covers of the form or mold may be raised to expose the composition to the atmosphere, which will rapidly dry and harden the exposed mass. When one side is thus dried or hardened the other side may be similarly exposed and dried or hardened, and then the block or piece thus molded or shaped may be taken out, and to prevent it from warping may be placed between boards or other smooth and even surfaces until dry and set, after which it will retain its shape or form. This drying or hardening between boards or other retaining-surfaces may be done in a chamber or atmosphere of from 75° to 95° Fahrenheit, and may require from three to four days before the stones are ready to be washed in liquid chlorcalcium, which is done repeatedly, and again well dried, which may be done in a few hours. After this the stones, blocks, or forms are placed in an oven and subjected to a temperature of 125° to 150° Fahrenheit, for, say, six hours. While yet warm they are again washed with chlorcalcium and again returned to the oven and the temperature therein raised to 230° to 270° of heat. After six hours exposure to this high temperature the stone becomes very hard, and receives a last washing in the chlorcalcium bath, and is now finished and ready for use.

If the stone is designed for burnishing steel, iron, enamel, and such like substances, the oxide of iron may be omitted from the composition and three parts of flour of emery, and three parts of paris-red (superoxide of iron) substituted therefor.

These stones may be furnished with handles or set upon shafts or arbors for facility in using them, or applying them to the various purposes for which they are applicable, as for grinding or sharpening scythes, sickles, cutlery, or any cutting or edged instrument. They may be used by engravers, carvers, glass workers, and jewelers, or for reducing or leveling steel or other metals, and as substitutes for files, chisels, or other reducing-instruments, emery or sand paper, and indeed for any grinding, polishing, reducing, or abrading purposes.

Having thus fully described the object and purpose of my invention and shown how the same may be practically carried into operation, what I claim, and desire to secure by Letters Patent, is—

The manufacture of artificial stones from the ingredients named, and by the processes, and for the purpose, and in the manner substantially as herein described and set forth.

HARTWICH VON UNWERTH.

Witnesses:
FR. KAPP,
JOS. L. HANCE.